(12) United States Patent
Hu

(10) Patent No.: US 6,938,760 B2
(45) Date of Patent: Sep. 6, 2005

(54) DISK POSITIONING STRUCTURE FOR A DISK CASE

(76) Inventor: Wen-Long Hu, No. 22-2, Alley 51, Lane 195, Kuang Hsing Rd., Pa Te City, Tao Yuan Hsien (TW)

( * ) Notice: Subject to any disclaimer, the term of this patent is extended or adjusted under 35 U.S.C. 154(b) by 82 days.

(21) Appl. No.: 10/697,976

(22) Filed: Oct. 31, 2003

(65) Prior Publication Data

US 2005/0092627 A1    May 5, 2005

(51) Int. Cl.[7] .............................................. B65D 85/57
(52) U.S. Cl. ..................... 206/310; 206/308.1; 206/493
(58) Field of Search ............................ 206/307, 308.1, 206/308.2, 309, 310, 311, 312, 493; 211/40, 211/41.12; 312/9.58

(56) References Cited

U.S. PATENT DOCUMENTS 6,398,022 B1 * 6/2002 Mou et al. ............... 206/308.1
6,766,904 B2 * 7/2004 Hu ............................. 206/310
6,779,659 B2 * 8/2004 Marsilio et al. .......... 206/308.1
6,863,176 B2 * 3/2005 Farrar et al. ............. 206/308.1
2003/0034259 A1 * 2/2003 Lopez mas .............. 206/308.2

FOREIGN PATENT DOCUMENTS

TW                 444753           7/2001

* cited by examiner

Primary Examiner—David T. Fidei
(74) Attorney, Agent, or Firm—Browdy and Neimark, P.L.L.C.

(57) ABSTRACT

A disk positioning structure disposed inside a disk case for holding a disk is constructed to include a flat base, two finger strips upwardly extended from the flat base, each finger strip having an outwardly extended retaining block for holding down the loaded disk, two stop plates respectively outwardly extended from the finger strips below the retaining block of each finger strip for supporting the loaded disk in place, and a fastening device provided between the finger strips and adapted to lock the finger strips in an inwardly tilted position for the loading of a disk when the user squeezing the finger strips with the fingers.

4 Claims, 7 Drawing Sheets

DISK POSITIONING STRUCTURE FOR A DISK CASE

BACKGROUND OF THE INVENTION

1. Field of the Invention

The present invention relates to a disk positioning structure provided inside a disk case for holding a disk, for example, a DVD, VCD, or CD. The disk positioning structure enables the user to load/unload the disk conveniently.

2. Description of the Related Art

Various disk cases have been disclosed for holding disks, and have appeared on the market. These disk cases commonly have a disk positioning structure for holding a disk FIGS. 1 and 1A show a design constructed according to Taiwan Patent Publishing No. 444753, filed by the present inventor. This design of disk positioning structure, referenced by 6, comprises two finger strips 62 upwardly extended from the center of the disk positioning structure, each finger strip 62 having a retaining block 63 at an outer side, and six spring strips 61 obliquely upwardly extended from the disk positioning structure toward each other and radially arranged around the retainer blocks 62.

Referring to FIG. 2, when the user loaded a disk 7 on the disk positioning structure, the center hole 71 of the disk 7 is coupled to the finger strips 62 and stopped between the retaining blocks 63 at the finger strips 62 and the six spring strips 61. When removing the disk 7 from the disk positioning structure, as shown in FIG. 3, squeeze the finger strips 62 toward each other with the user to disengage the retaining blocks 63 from the disk 7, for enabling the disk 7 to be pushed upwards by the six spring strips 61. Thus, the disk 7 can easily be removed from the disk positioning structure.

This design of disk positioning structure still has drawbacks. Because the gaps between the retaining blocks 63 and the spring strips 61 are at the same vertical point of applied force, the retaining blocks 63 give a downward pressure to the disk 7 when the spring strips 61 pushing the disk 7 upwards. Therefore, the disk 7 may be forced to deform and to further damage the storage media. Further, because there is no means to buffer the spring strips 61 against downward pressure from the disk 7, the spring strips 61 wear quickly with use.

Therefore, it is desirable to provide a disk positioning structure that eliminates the aforesaid drawbacks.

SUMMARY OF THE INVENTION

The present invention has been accomplished under the circumstances in view. It is the main object of the present invention to provide a disk positioning structure, which does not cause the loaded disk to deform. It is another object of the present invention to provide a disk positioning structure, which is durable in use and, does not deform easily with use.

To achieve these and other objects of the present invention, the disk positioning structure is disposed inside a disk case and adapted to hold a disk, comprising: a flat base; two upright finger strips upwardly extended from the flat base and arranged in parallel, the upright finger strips each having a retaining block perpendicularly outwardly extended from an outer side thereof and adapted to hold down a disk; two stop plates respectively outwardly extended from the finger strips below the retaining block at each the upright finger strip for supporting a disk on the disk positioning structure; and fastening means provided between the upright finger strips and adapted to lock the upright finger strips in an inwardly tilted position when the upright fingers strips are squeezed inwards by the user.

DETAILED DESCRIPTION OF THE PREFERRED EMBODIMENT

Figure 1:
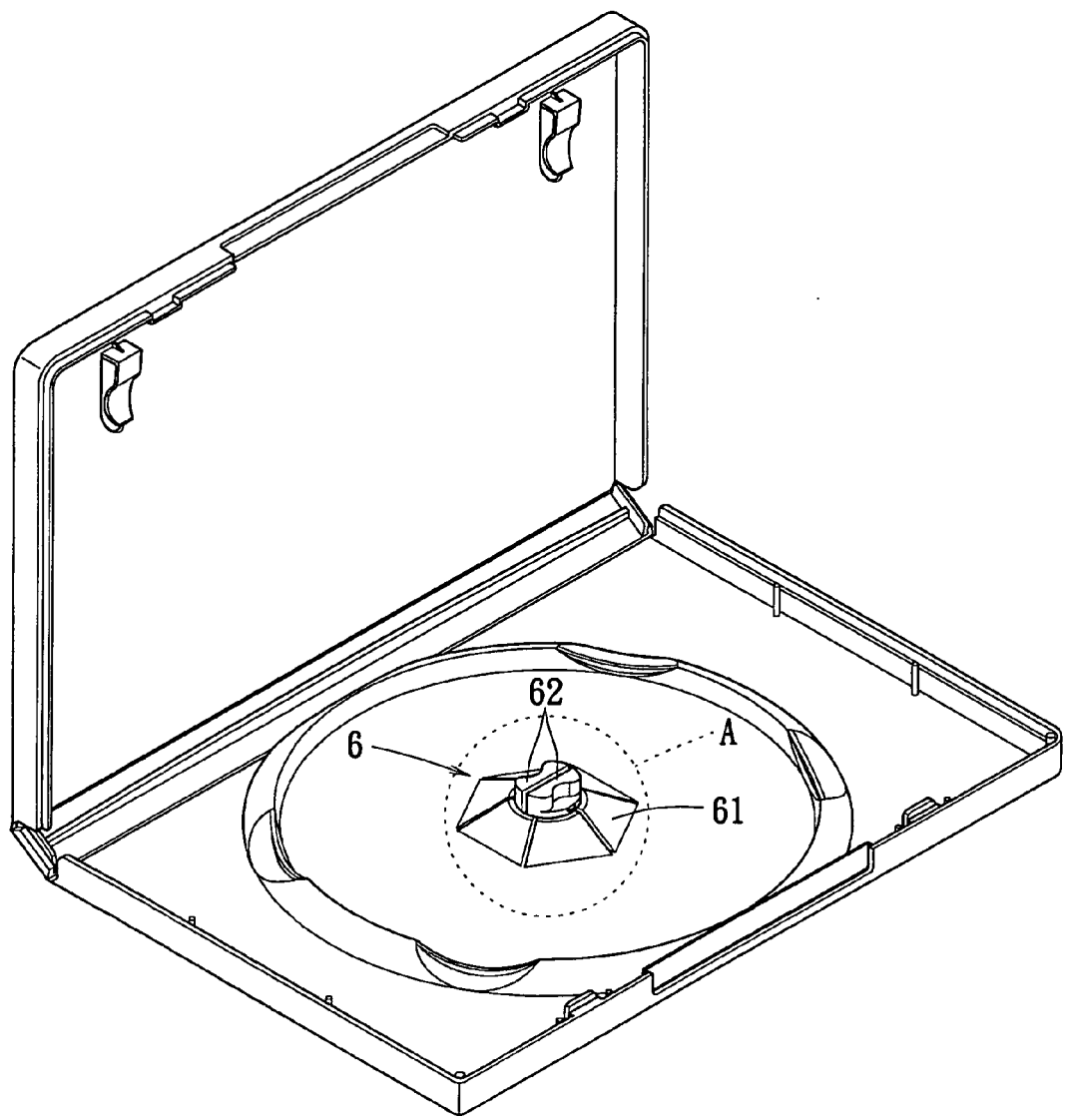
FIG. 1 is a perspective open view of a disk case according to the prior art.
Figure 1A:
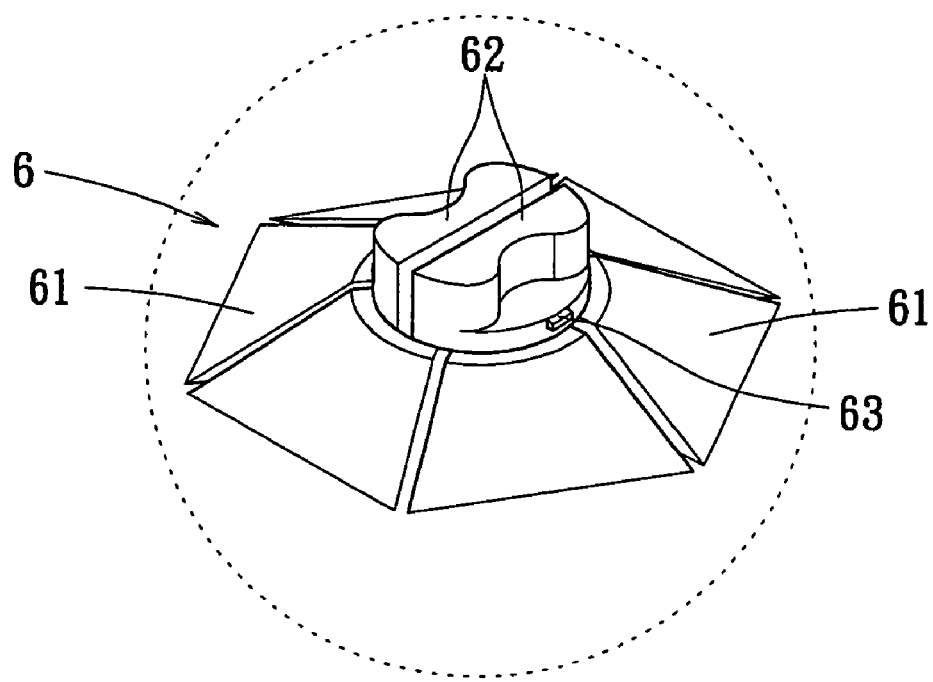
FIG. 1A is an enlarged view of part A of FIG. 1.
Figure 2:
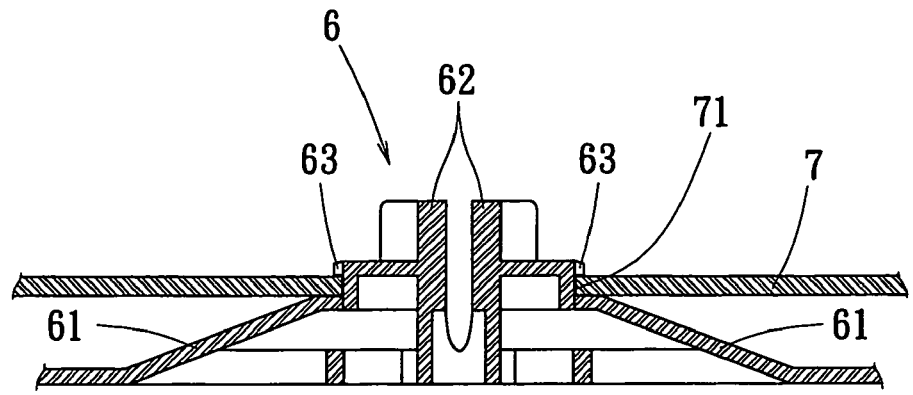
FIG. 2 is a sectional side view showing a disk loaded on the disk positioning structure according to the prior art.
Figure 3:
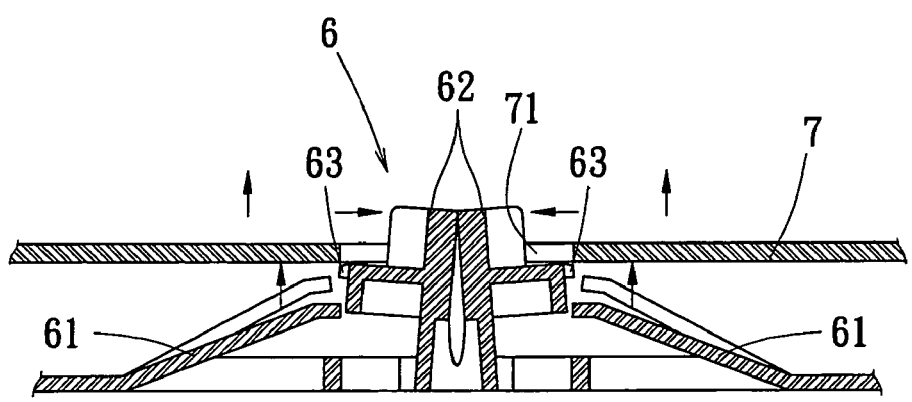
FIG. 3 is a schematic drawing showing the disk unloading action according to the prior art.
Figure 4:
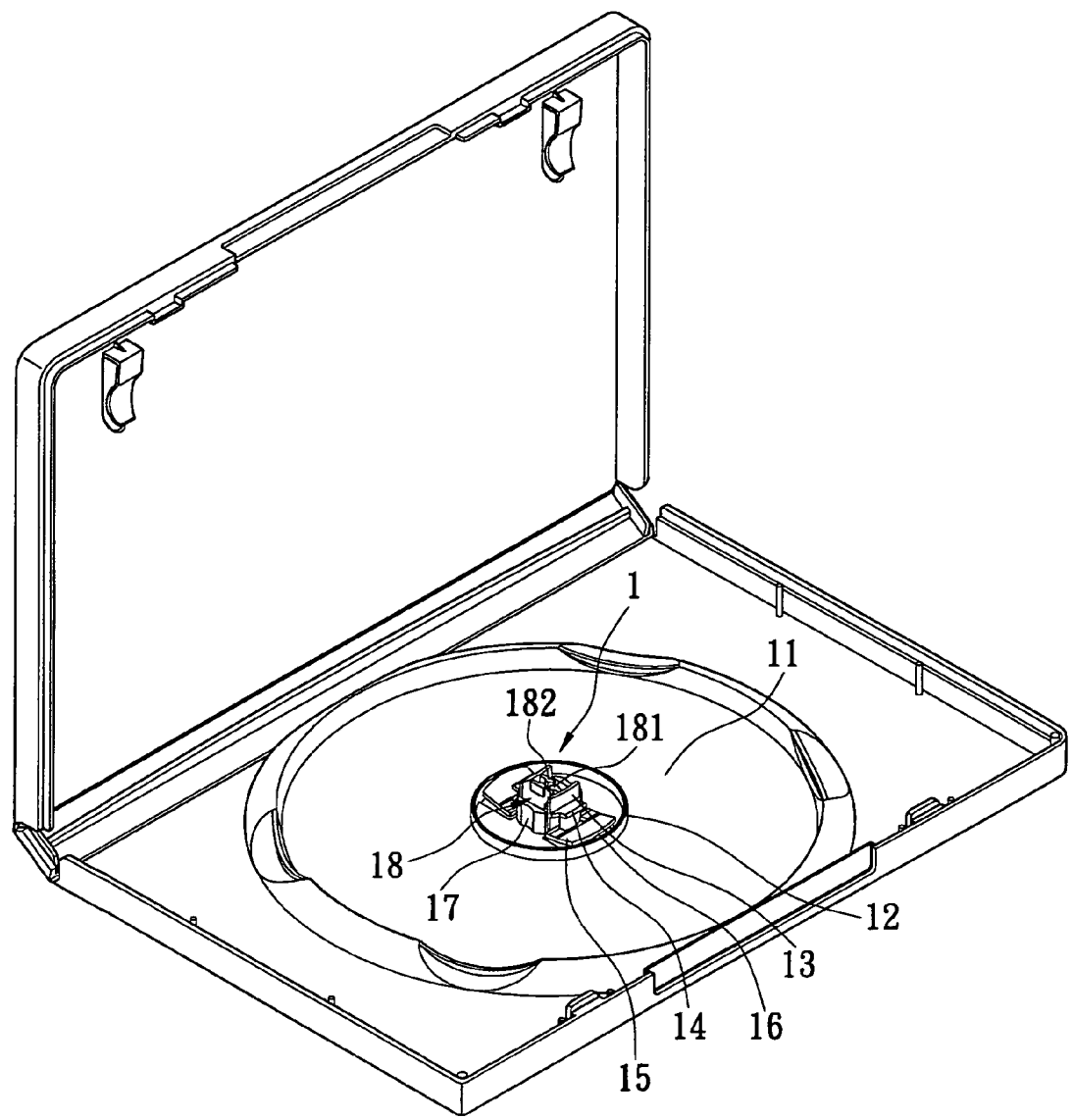
FIG. 4 is a perspective open view of a disk case according to the present invention.
Figure 8:
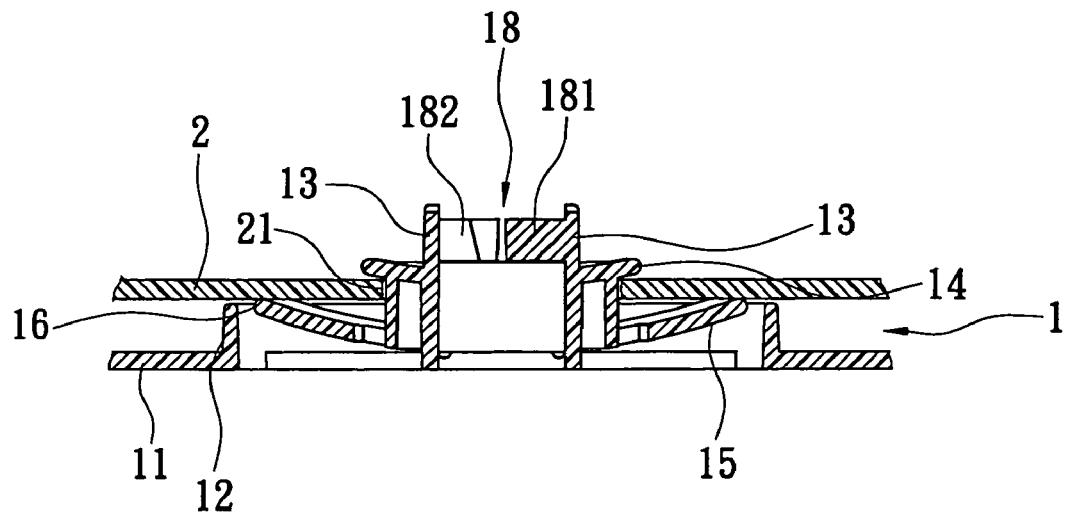
FIG. 8 is similar to FIG. 7 but showing a disk loaded on the disk positioning structure.

Referring to FIG. 4, a disk positioning structure 1 is shown adapted to hold a disk (DVD, VCD, CD) 2 inside a disk case (see FIG. 8).

Figure 5:
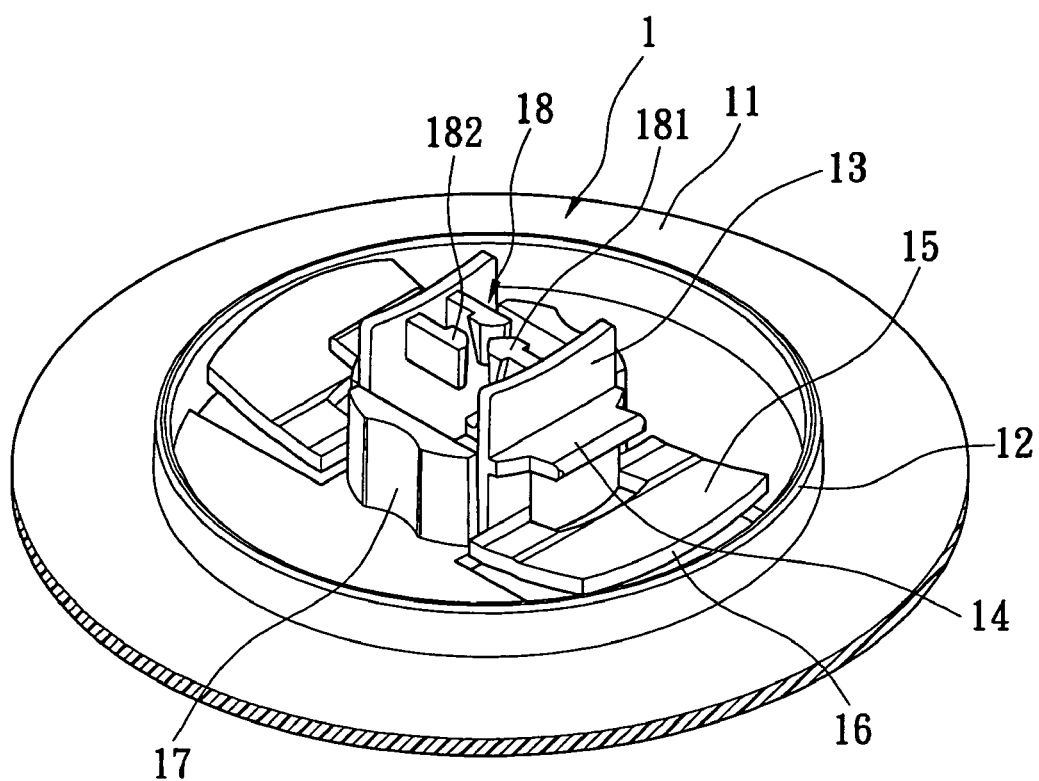
FIG. 5 is a perspective view of the disk positioning structure according to the present invention.
Figure 6:
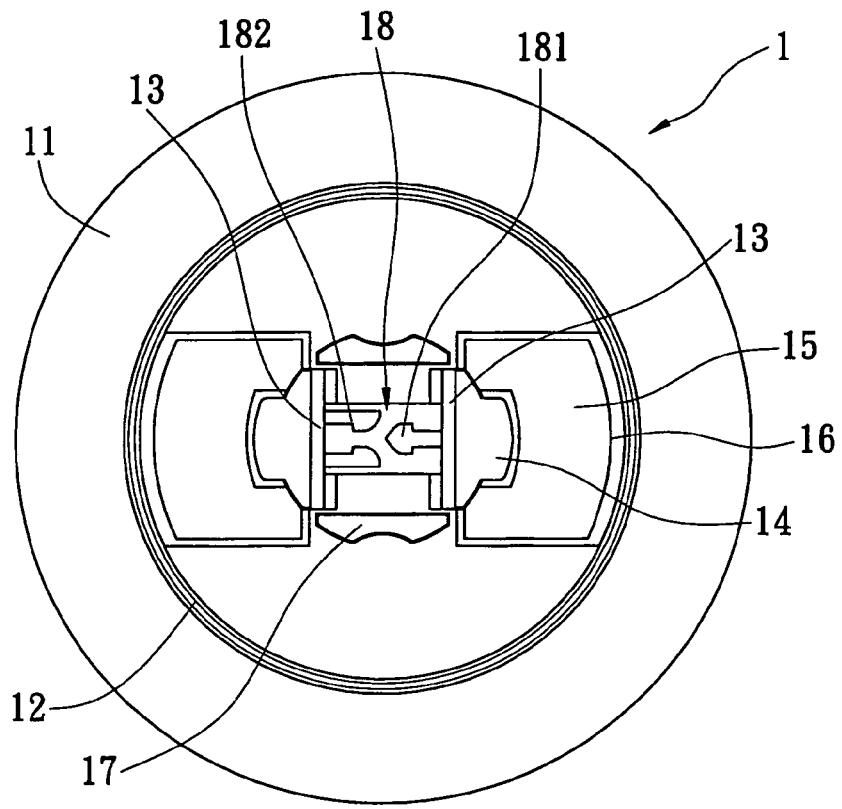
FIG. 6 is a top plain view of the disk positioning structure according to the present invention.
Figure 7:
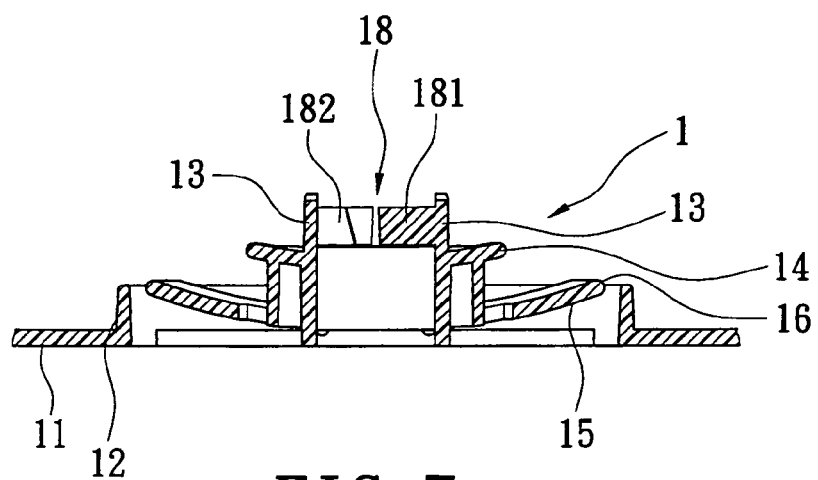
FIG. 7 is a side view in section of the disk positioning structure according to the present invention.

Referring to FIGS. 5~7, the disk positioning structure 1 comprises a flat base 11 formed integral with the disk case, an upright annular flange 12 protruded from the top surface of the flat bottom base 11, two finger strips 13 symmetrically upwardly extended from the flat base 11 within the upright annular flange 12 and spaced from each other at a distance so that the finger strips 13 can be squeezed toward each other with the fingers, two retaining blocks 14 respectively outwardly extended from the finger strips 13 near the top, two smoothly arched springy stop plates 15 respectively outwardly extended from the finger strips 13 below the retaining blocks 14 within the upright annular flange 12 for supporting a disk on the disk positioning structure 1 without pressure, each stop plate 15 having a free end terminating in a smoothly arched stop edge 16, two upright positioning posts 17 formed integral with the flat base 11 and symmetrically disposed at two sides of the finger strips 13 for insertion into the center hole of the disk loaded on the disk positioning structure 1, each upright positioning post 17 having a transversely smoothly arched outer surface portions fitting the circular periphery of the center hole of the disk loaded on the disk positioning structure 1, and a fastening device 18 provided between the two upright finger strips 13. The fastening device 18 according to this embodiment is comprised of a male hook member 181 and a female hook member 182. The male hook member 181 and the female hook member 182 are respectively extended from the upright finger strips 13 toward each other. The female hook member 182 is adapted to receive the male hook member 181.

Before squeezing the upright finger strips 13 toward each other, the male hook member 181 and the female hook member 182 do not contact each other. When in use, squeeze the upright finger strips 13 toward each other to force the male hook member 181 into engagement with the female hook member 182. After engagement between the male hook member 181 and the female hook member 182, the upright finger strips 13 are held in position for the loading of a disk.

Figure 9:
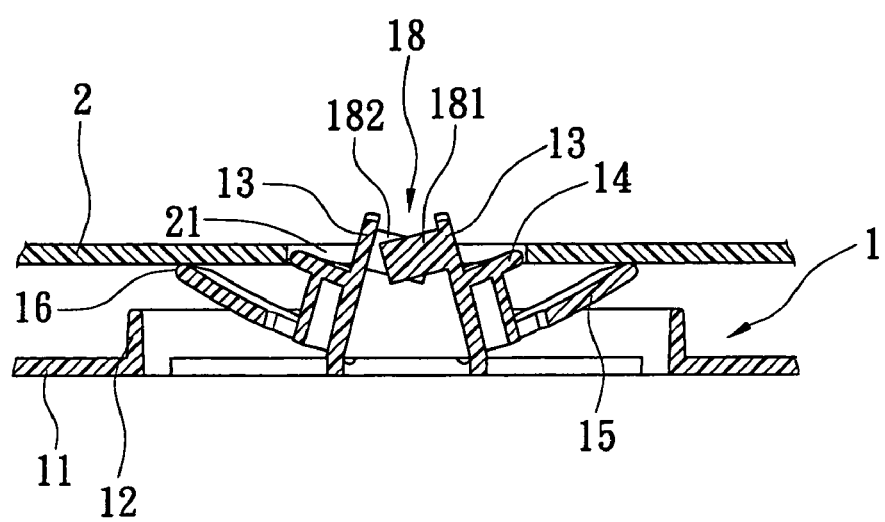
FIG. 9 is similar to FIG. 8 but showing the upright finger strips squeezed inwards, the male hook member engaged with the female hook member.

Referring to FIG. 9, when loading a disk 2 on the disk positioning structure 1, the center hole 21 of the disk 2 is aimed at the upright finger strips 13 and the upright positioning posts 17, and then lower the disk 2 for let the upright finger strips 13 and the upright positioning posts 17 be inserted through the center hole 21 of the disk 2, and then force the disk 2 downwards over the retaining blocks 14, for enabling the disk 2 to be retained between the retaining blocks 14 and the stop plates 15 (see FIG. 8), and therefore the disk 2 is secured to the disk positioning structure 1.

Referring to FIG. 9 again, when removing the disk 2 from the disk positioning structure 1, squeeze the upright finger strips 13 with the fingers toward each other to disengage the retaining blocks 14 from the disk 2. At this time, the disk 2 is free from the constraint of the retaining blocks 14, and the stop plates 15 are simultaneously forced to push the disk 2 upwards, and therefore the user can conveniently take the disk 2 away from the disk positioning structure 1.

As indicated above, the invention comprises a fastening device 18 provided between the upright finger strips 13. When the user wishing to remove the disk 2 from the disk positioning structure 1, squeeze the upright finger strips 13 toward each other with the fingers to force the male hook member 181 into engagement with the female hook member 182 (see FIG. 9), stopping the finger strips 13 from outward tilting, and therefore the retaining blocks 14 and the stop plates 15 are respectively held in an outwardly upwardly sloping position. When loading a disk 2 on the disk positioning structure 1 at this time, the retaining blocks 14 are suspended in the center hole 21 of the disk 2, and the smoothly arched stop edges 16 of the stop plates 15 are stopped at the bottom side of the disk 2. When forcing the disk 2 downwards, the stop plates 15 are forced to move the retaining blocks 14 outwards to stop at the top side of the disk 2, and at the same time the male hook member 181 is disengaged from the female hook member 182. Therefore, the disk 2 is locked to the disk positioning structure 1.

A prototype of disk positioning structure has been constructed with the features of the annexed drawings of FIGS. 4~9. The disk positioning structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A disk positioning structure disposed inside a disk case and adapted to hold a disk, comprising:
   a flat base;
   two upright finger strips upwardly extended from said flat base and arranged in parallel, said upright finger strips each having a retaining block perpendicularly outwardly extended from an outer side thereof and adapted to hold down a disk;
   two stop plates respectively outwardly extended from said finger strips below the retaining block at each said upright finger strip for supporting a disk on the disk positioning structure; and
   fastening means provided between said upright finger strips and adapted to lock said upright finger strips in an inwardly tilted position when said upright fingers strips are squeezed inwards by the user.

2. The disk positioning structure as claimed in claim 1, wherein said flat base comprises an upright annular flange surrounding said two stop plates.

3. The disk positioning structure as claimed in claim 1, wherein said stop plates are smoothly arched.

4. The disk positioning structure as claimed in claim 1, wherein said fastening means comprising a male hook member perpendicularly extended from an inner side of one of said upright finger strips, and a female hook member perpendicularly extended from an inner side of the other of said upright finger strips and adapted to receive said male hook member.

* * * * *